Figure 1:
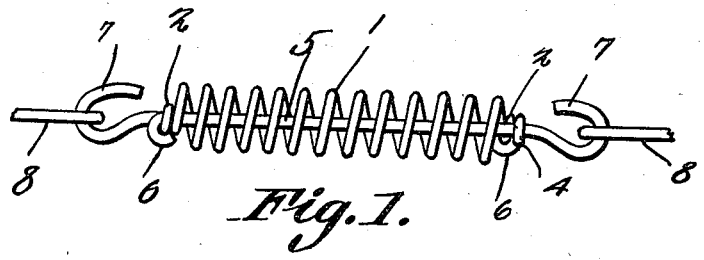

Jan. 30, 1923.

O. SCHILLING.
FASTENING FOR AUTOMOBILE CHAINS.
FILED AUG. 15, 1921.

1,443,653

Oscar Schilling, Inventor

By C. A. Snow & Co.
Attorneys

Patented Jan. 30, 1923.

1,443,653

UNITED STATES PATENT OFFICE.

OSCAR SCHILLING, OF WARSAW, ILLINOIS.

FASTENING FOR AUTOMOBILE CHAINS.

Application filed August 15, 1921. Serial No. 492,286.

*To all whom it may concern:*

Be it known that I, OSCAR SCHILLING, a citizen of the United States, residing at Warsaw, in the county of Hancock and State of Illinois, have invented a new and useful Fastening for Automobile Chains, of which the following is a specification.

This invention aims to provide a simple but efficient means whereby the ends of the side members of an anti-skid chain for an automobile wheel may be resiliently connected.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 2:
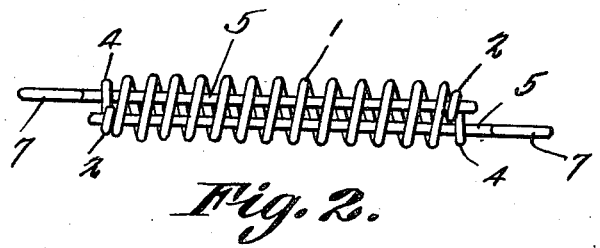
Figure 3:
Figure 4:
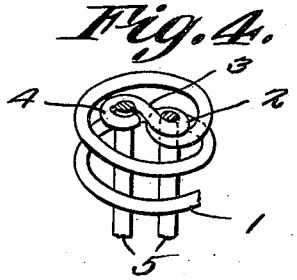

Figure 1 shows in side elevation, a device constructed in accordance with the invention; Figure 2 is an elevation wherein the structure is viewed at right angles to the showing of Figure 1; Figure 3 is an end elevation; and Figure 4 is a perspective view showing one end of the spring and attendant parts.

In carrying out the invention there is provided a helical compression spring 1 each terminal convolution of which is bent upon itself to form a closed eye or keeper 2, the eye or keeper being prolonged to fashion an extension 3 which is bent upon itself to form a closed eye or guide 4. Slidable members in the form of rods 5 are located within the spring 1, the rods 5 being mounted to reciprocate in the guides 4 and having hooks 6 engaging the keepers 2. At their outer ends, the rods 5 are supplied with attaching elements 7, whereby the device may be assembled with the links 8 at the ends of the side members of an anti-skid chain. Clearly, the spring 1, being under compression, will tend to draw the attaching elements 7 toward each other and to tighten up the side chains.

Having thus described the invention, what is claimed is:

In a device of the class described, a helical compression spring, the terminal convolutions of which are prolonged inwardly to form keepers, the keepers being extended to form guides; members slidable in the guides and spaced thereby from contact with the spring, said members being provided at their inner ends with means for engaging the keepers, the said members being supplied at their outer ends with attaching elements.

In testimony that I claim the foregoing as my own, I have hereto affixed my signature in the presence of two witnesses.

OSCAR SCHILLING.

Witnesses:
HARRY E. NELSON,
FRED SCHILDMAN.